United States Patent Office 3,560,583
Patented Feb. 2, 1971

---

3,560,583
PROCESS OF PREPARING SUBSTITUTED CYCLOPENTADIENES
Clare Augustus Stewart, Jr., Wilmington, Del., assignor to E. I. du Pont de Nemours and Company, Wilmington, Del.
No Drawing. Filed May 15, 1969, Ser. No. 825,039
Int. Cl. C07c 3/00
U.S. Cl. 260—666                     10 Claims

ABSTRACT OF THE DISCLOSURE

Substituted cyclopentadienes are prepared by reacting a cyclopentadiene compound with an alkali metal hydroxide and a substituted alkyl halide in the presence of a quaternary ammonium salt catalyst.

BACKGROUND OF THE INVENTION

It is known that substituted cycolpentadienes can be prepared by reacting a cyclopentadiene with metallic sodium and an alkyl halide to yield a substituted cyclopentadiene.

A problem involved in the use of the above reaction is that the free hydrogen formed can cause unwanted side reactions. Other problems are created by the use of metallic sodium. It is well known that sodium is highly reactive requiring cautious handling procedures and it is a known fire hazard.

Therefore, there is a need for a method of producing substituted cyclopentadienes without producing free hydrogen and without the use of metallic sodium.

SUMMARY OF THE INVENTION

Accordingly, this invention provides a process of preparing substituted cyclopentadienes by mixing at a temperature of 0–120° C.

(a) a cyclopentadiene compound having the general formula:

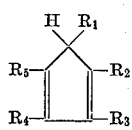

where $R_1$, $R_2$, $R_3$, $R_4$, and $R_5$ are independently hydrogen or alkyl, aryl or aralkyl radicals (b) 0.3 to 10 moles of a substituted alkyl halide per mole of cyclopentadiene compound where the substituted alkyl halide has the general formula:

$$X-CH_2-Y$$

where X is chlorine, bromine or iodine, and Y is aryl, vinyl, substituted aryl or substituted vinyl (c) at least one mole of an alkali metal hydroxide per mole of substituted alkyl halide to provide a weight ratio of alkali metal hydroxide to water in the aqueous phase of the reaction mixture after the reaction has taken place of at least about 0.2 to 1; and (d) 0.1 to 10 weight percent of a quaternary ammonium salt based on the weight of the cyclopentadiene compound.

DETAILS OF THE INVENTION

The cyclopentadiene compounds useful in the present invention have the general formula:

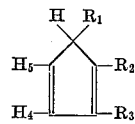

where $R_1$, $R_2$, $R_3$, $R_4$ and $R_5$ can independently be hydrogen, or an alkyl, aryl or aralkyl radical.

Representative cyclopentadienes that can undergo substitution according to the present invention are cyclopentadiene, methylcyclopentadiene, mono- or polyalklycyclopentadienes, phenylcyclopentadiene, benzylcyclopentadiene, and 1,4-bis-cyclopentadienyl-butene-2.

The alkali metal hydroxide useful in this invention can be sodium hydroxide, potassium hydroxide, or lithium hydroxide. Sodium hydroxide is particularly preferred because it is most readily available. The alkali metal hydroxide can be conveniently added in an aqueous solution or it can be added as a solid. The degree of concentration of alkali metal hydroxide affects the reaction rate of the mixture and it has been found that irrespective of how the sodium hydroxide is added, a practical reaction rate is achieved when the concentration of alkali metal hydroxide is sufficient to provide at least one mole of alkali metal hydroxide per mole of substituted alkyl halide to provide a weight ratio of alkali metal hydroxide to water in the aqueous phase of the reaction mixture after the reaction has taken place of at least about 0.2 to 1.

The substituted alkyl halides useful in the present invention have the general formula:

$$X-CH_2-Y$$

where X equals chlorine, bromine, or iodine and Y is aryl, vinyl, substituted aryl or substituted vinyl.

The substituted aryl or substituted vinyl can have any one of a wide variety of substituents known provided the substituent is not subject to degradation by the alkaline environment. For example, substituted vinyl includes alkyl or aryl substituted vinyl, chloroalkyl substituted vinyl, and alkoxyalkyl substituted vinyl while substituted aryl includes phenyl, methyl substituted phenyl, $\alpha$ or $\beta$ naphthyl, or phenyl or naphthyl groups themselves containing substituents as described for substituted vinyl above.

Representative substituted alkyl halides are 3-chloropropene-1, 1-chlorobutene-2, 1-chloropentene-2, 3-chloro-2-methylpropene-1, 1-chloro-3-methylbutene-2, 1,4-dichlorobutene-2, benzyl chloride, p-methylbenzyl chloride, chloromethyl-napthalenes, chloromethyl diphenyl ether, p-xylylene dichloride, 3-bromopropene-1, benzyl iodide.

The halide compound should be present in the amount of 0.3 to 10 moles of substituted alkyl halide to 1 mole of cyclopentadiene. Theoretically, on cyclopentadiene only six positions can be available for substitution; therefore, the theoretical upper limit of halide consumed would be 6 moles of halide to 1 mole cyclopentadiene. However, a greater amount of halide can be used to approach a complete substitution of the cyclopentadiene.

The quaternary ammonium compounds that can be used in practicing this invention are of many different types. The nitrogen can be substituted with four cyclic or acyclic organic radicals or can be part of a ring. The quaternary compound can contain one or more than one quaternary ammonium group. The aliphatic groups on the nitrogen can be cyclic or acyclic, branched or unbranched, saturated or unsaturated. Aromatic rings can be attached to the nitrogen, or the aromatic ring can be a substituent on an aliphatic chain. It is not essential that these radicals be free of non-hydrocarbon substituents. When the quaternary nitrogen function is part of a ring, the ring can be aromatic or non-aromatic. The ring can contain only carbon atoms or can contain other nitrogen atoms, or other members such as oxygen or sulfur atoms. Usually, the rings contain five to seven members. Fused rings systems can be used.

In general, the catalysts increase in effectiveness as the chain length of at least one substituent on the nitrogen increases. Improved effectiveness is also imparted by a hydroxy or ether group in a position beta to the nitrogen atom.

In the quaternary ammonium compounds the anion is not critical. It can be a halogen ion, a hydroxy ion, an ethyl sulfate ion, or any anion which does not interfere with the reaction and which does not promote polymerization of the product. Most often the chloride ion is used because the chlorides are most readily available and least expensive.

Representative catalysts for use in the present invention are (a) the compounds having the general formula $$R_9R_{10}R_{11}R_{12}NCl$$

wherein $R_9$, $R_{10}$ and $R_{11}$ are aliphatic radicals of up to about 20 carbon atoms and $R_{12}$ is an aliphatic radical from about 8 to 20 carbon atoms or a benzyl or substituted benzyl radical; and (b) compounds of the above structure in which at least one of $R_9$, $R_{10}$ and $R_{11}$ contain a hydroxy or ether group in a position beta to the nitrogen atom. Typical of the compounds of type (b) are those having the structure $$H(OCH_2CH_2)_xNR_{13}(CH_3)(CH_2CH_2O)_yH \cdot Cl$$

wherein $R_{13}$ is an aliphatic hydrocarbon radical of up to about 20 carbon atoms and the sum of $x+y$ ranges from about 2 to about 15.

Preferred quaternary ammonium salts are the following:

($C_{12}$–$C_{18}$ alkyl)(benzyl)N($CH_3$)$_2$Cl
($C_{12}$–$C_{18}$ alkyl)(benzyl)N($CH_2$CHOH$CH_3$)$_2$Cl
($C_{12}$–$C_{18}$ alkyl)(benzyl)N($CH_2CH_2OH$)$_2$Cl
($C_{12}$–$C_{18}$ alkylbenzyl)N($CH_2CH_2OH$)$_3$Cl The amount of quaternary ammonium compound to be used in practicing the present invention process varies from about 0.1 to about 10% by weight based on the weight of cyclopentadiene present.

The process of the present invention is carried out by adding all the ingredients together and mixing. This can be done in a batch or continuous process. The reaction is an exothermic reaction, therefore, it is generally helpful to control the temperature of the reaction by adding in moderate amounts either the substituted alkyl halide or the alkali metal hydroxides. The temperature can range from 0–120° C., however, it is advantageous to practice this invention between 10–50° C. Solid salt is usually fromed in the process and water is added as necessary to dissolve the salt after completion of the substitution process. The substituted cyclopentadiene product can be separated from the mixture by conventional techniques such as phase decantation or distillation.

Although the chemical reasons for the effectiveness of this invention are not entirely understood, it is believed that substituted cyclopentadienes are formed by mixing of a cyclopentadiene anion as such or the anion in association with cation present in the organic phase of the reaction mixture and a substituted alkyl halide. It is therefore necessary for the starting cyclopentadiene compound to contain at least one readily ionizable hydrogen atom. In addition, since the cyclopentadiene anion is a resonance hybrid structure in which all positions have at least some degree of reactivity, a mixture of isomers can be formed. Further, since ion formation is reversible, the starting material is rapidly converted under basic catalysis to a mixture of isomers. The product, if it contains ionizable hydrogen atoms, will similarly consist of a mixture of isomers. Reactions leading to isomerization and substitution of a mono-substituted cyclopentadiene are illustrated in part below:

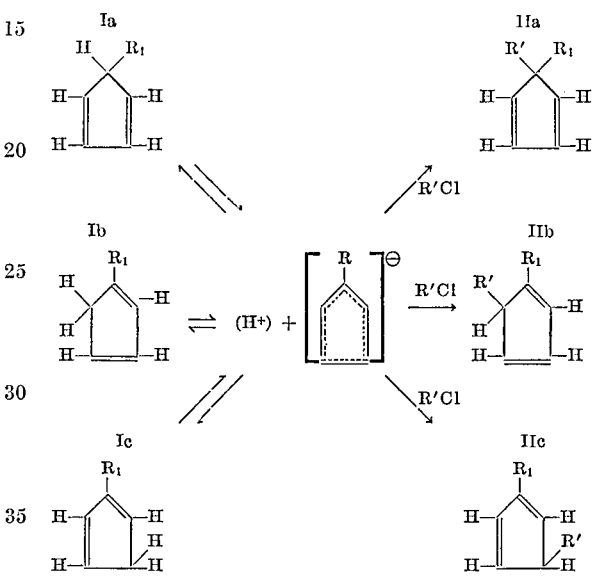

where $R_1$ is independently hydrogen, an alkyl, aryl or aralkyl radical and R′ a substituted alkyl radical.

Starting materials Ia, Ib, and Ic are readily isomerized, even in the absence of basic catalysts (Mironov, et al., Tetrahedron, volume 19, pp. 1939–1958 [1963]). Product IIa is stable to isomerizing conditions if neither R group is hydrogen, is not subject to further substitution, and dimerizes or undergoes other Diels-Alder type reactions relatively slowly. Products IIb and IIc contain ionizable protons and can readily undergo isomerization comparable to the starting material or subsequent substitution reactions.

Both starting materials and products readily enter into dimerization, cross-dimerization, and other Diels-Alder reactions with other unsaturated materials which can be present in the reaction mixture. It is therefore advantageous to perform the desired reaction rapidly under mild conditions to avoid formation of undesired products. To this end, the present invention is preferably practiced using at least one mole of alkali metal hydroxide per mole of substituted alkyl halide to provide a weight ratio of alkali metal hydroxide to water in the aqueous phase of the reaction mixture after the reaction has taken place of at least about 0.2 to 1 plus a sufficient amount of catalyst, agitation, and proper cooling so that the reaction is substantially complete before undesirable amounts of starting material have been consumed by such reactions. Reactions can be modified by dilution of the organic materials or by use of excess of one reagent or the other depending on the desired product and ease of separation in a manner obvious to one skilled in the art.

The substituted cyclopentadienes of this invention can be used as antiozonants in neoprene or it can also be used to prepare polymers as disclosed in U.S. 2,725,232.

The process of this invention is ilustrated by the following examples. All parts, percentages and ratios are by weight unless otherwise designated.

EXAMPLE 1

Allyl cyclopentadiene

The following ingredients are charged to a 250-ml. Erlenmeyer flask equipped with a magnetic stirrer and a water bath at a temperature of 20–30° C.:

Cyclopentadiene—35 ml. (0.43 mole)
3-chloropropene-1—30 ml. (0.365 mole)
Sodium hydroxide (50 wt. percent aqueous solution)—25 ml. (0.48 mole)
Aqueous alcoholic solution containing 50 wt. percent coco-approximately C–12 alkyl derived from cocoanut oil) benzylbishydroxypropylammonium chloride—2 ml.

Stirring is initiated and a reaction is immediately evidenced by the evolution of heat and the precipitation of sodium chloride. Stirring is continued for one hour. The weight ratio of sodium hydroxide to water is 0.45:1 after the reaction has taken place. Sufficient water is then added to dissolve the sodium chloride and the aqueous and organic phases are separated by conventional means.

The aqueous phase contains 0.21 gram equivalents of chloride ion. The organic phase is dried over sodium sulfate, and the unreacted starting materials are removed by evaporation at 90 mm. absolute pressure and ambient temperature.

The organic phase is distilled to 70° C. and 40 mm. pressure yielding 14.1 g. of distillate and 9 g. of higher boiling residue which is not distilled. A sample of the distillate is analyzed by nuclear magmetic resonance (NMR) spectroscopy indicating a mixture of 1- and 2-allyl cyclopentadiene with little, if any, of the 5-isomer. To confirm this result, a maleic anhydride adduct is prepared from a sample of distillate by mixing one gram of the distillate with 0.8 g. of maleic anhydride dissolved in 10 ml. of acetone. The mixture is heated to a boil, evaporating the volatiles. This adduct is analyzed by NMR spectroscopy and indicates a 40:60 ratio of 1:2 allyl cyclopentadienes. On standing, the distillate is slowly converted to dimers.

EXAMPLE 2

Poly allylcyclopentadienes

A four-necked, 250 ml. flask equipped with stirrer, thermometer, addition funnel, cooling bath and condenser is charged with the following ingredients:

Cyclopentadiene—10 ml. (0.123 mole)
3-chloropropene-1—70 ml. (0.85 mole)
50 wt. percent aqueous alcoholic solution of $C_{12-16}$ alkyl-benzyl-dimethyl-ammonium chloride—2 ml.
Water—5 ml.

The mixture is placed under a nitrogen blanket and vigorously agitated while 80 ml. (1.55 moles) of a 50 weight percent aqueous solution of sodium hydroxide is added over a period of one hour. The cooling bath is used to maintain a temperature of 25–40° C. The weight ratio of sodium hydroxide to water is 0.51:1 after the reaction has taken place. A sufficient amount of water is added to dissolve the salt which precipitates, then the aqueous and organic phases are separated by conventional means. The aqueous phase contains 0.45 equivalent of chloride ion. The organic phase is purified by evaporating the unreacted starting materials at 0.5 mm. absolute pressure leaving very little residue. The purified organic phase is distilled and the distillate is examined by vapor phase chromatography and found to be a mixture of compounds which are identified by mass spectroscopy and nuclear magnetic resonance spectra as mixed isomers of di, tri, tetra, penta and hexa allyl-cyclopentadienes.

EXAMPLE 3

Benzyl cyclopentadiene

A reaction mixture is prepared in the manner described in Example 1 by mixing the following ingredients:

Cyclopentadiene—33 ml. (0.4 mole)
Benzyl chloride—23 ml. (0.2 mole)
Sodium hydroxide (50 wt. percent aqueous solution)—20 ml. (0.39 mole)
50 wt. percent aqueous alcoholic solution of $C_{12-16}$ alkyl-benzyl-dimethyl-ammonium chloride—2 ml.

The water bath is heated to 40° C. within five minutes and to 50° C. within 24 minutes. The mixture is held for 25 minutes at 50° C. then cooled to room temperature and allowed to stand overnight. The weight ratio of sodium hydroxide to water is 0.36:1 after the reaction has taken place.

Water is added to dissolve the salt formed and the organic and aqueous phases are separated by conventional means. The aqueous phase contains 0.183 gram equivalent of chloride. Unreacted volatiles are removed by evaporation at 90 mm. absolute pressure and room temperature. The organic phase is 32.3 g. of oil consisting primarily of benzyl cyclopentadiene and mono- and di-benzyl dicyclopentadienes.

EXAMPLE 4

1,4-biscyclopentadienylbutene-2

A reaction mixture is prepared according to Example 1 by charging the Erlenmeyer flask with the following ingredients:

Cyclopentadiene—30 ml. (0.37 mole)
1,4-dichlorobutene-2—13.5 ml. (0.125 mole)
Sodium hydroxide (50 weight percent aqueous solution)—25 ml. (0.48 mole)
50 wt. percent aqueous alcoholic solution of $C_{12-16}$ alkyl-benzyl- dimethyl-ammonium chloride—2 ml.

The mixture is stirred for 25 minutes, and heat evolves. After 5 minutes of stirring the reaction vessel is cooled with a room temperature water bath for 10 minutes then warmed in a 50° C. water bath for 10 minutes. The weight ratio of sodium hydroxide to water is 0.41:1 after the reaction has taken place. Water is added to dissolve salt that forms during the reaction and then the organic and aqueous phases are separated by conventional means.

The aqueous phase is analyzed and found to contain 0.23 gram equivalents of chloride ion. The organic phase is analyzed by vapor phase chromatography and found to contain unreacted cyclopentadiene, dicyclopentadiene, a trace of residual dichlorobutene, a small amount of one higher boiling species believed to be chlorobutenyl-cyclopentadiene, and substantial amounts of material with too high a boiling point to elute from the chromatograph but reactive toward maleic anhydride. This material is believed to be unpolymerized 1,4-biscyclopentadienylbutene-2 as obtained but combines with itself on standing to form polymeric species and with cyclopentadiene to form lower molecular weight dicyclopentadiene compounds.

EXAMPLE 5

Poly (1,4-bis-cyclopentadienyl-butene-2)

A 500-ml. flask equipped according to the description in Example 2 is charged with the following ingredients:

Cyclopentadiene—150 ml. (1.93 moles)
1,4-dichlorobutene-2—64 ml. (0.58 mole)
Toluene—3 ml.
16 wt. percent aqueous methanol solution of $C_{12-16}$ alkyl-benzyl-dimethyl-ammonium chloride—15 ml.

The reactants are placed under a nitrogen blanket, stirring initiated and 124 ml. (2.38 moles) of a 50% aqueous solution of sodium hydroxide is added over a 38 minute time period while the water bath temperature rises from room temperature to 50° C. where it is maintained for the last 22 minutes of stirring. The pressure on the reaction flask is then adjusted to 100 mm. of mercury and the unreacted cyclopentadiene is removed by evaporation. Toluene in the amount of 50 ml. is added, the flask immersed in a 90° C. water bath under a nitrogen blanket for 45 minutes. The weight ratio of sodium hydroxide to water is 0.41 after the reaction has taken place. Water is added to dissolve the salt that forms and the aqueous and organic phases are separated by conventional means. The aqueous phase is analyzed and found to contain 1.16 gram equivalents of chloride. The organic phase is dried and unreacted materials are evaporated at 90° C. and an absolute pressure of 0.5 mm. of mercury. The organic phase consists of polymerized 1,4-biscyclopentadienyl-butene-2, a light brown oil which thickens on cooling.

I claim:
1. A process of preparing substituted cyclopentadiene compounds by mixing at a temperature of 0–120° C.
   (a) a cyclopentadiene compound having the general formula:

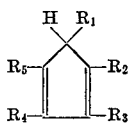

where $R_1$, $R_2$, $R_3$, $R_4$, and $R_5$ independently are hydrogen, alkyl, aryl or aralkyl radicals;
   (b) 0.3 to 10 moles of a substituted alkyl halide per mole of cyclopentadiene compound where the substituted alkyl halide has the general formula:

$$X\text{---}CH_2\text{---}Y$$

where X is chlorine, bromine or iodine; Y is aryl, vinyl, substituted aryl or substituted vinyl;
   (c) at least one mole of an alkali metal hydroxide per mole of alkyl halide to provide a weight ratio of alkali metal hydroxide to water in the aqueous phase of the reaction mixture after the reaction has taken place of at least about 0.2 to 1; and
   (d) 0.1 to 10 weight percent of a quaternary ammonium salt based on the weight of the cyclopentadiene compound.

2. The process of claim 1 in which the cyclopentadiene compound is cyclopentadiene.
3. The process of claim 1 in which the alkali metal hydroxide is sodium hydroxide.
4. The process of claim 3 in which the cyclopentadiene compound is cyclopentadiene.
5. The process of claim 4 in which cyclopentadiene is mixed at a temperature of 20–50° C. with
   (a) 0.3–0.5 mole of 1,4-dichlorobutene-2 per mole of cyclopentadiene;
   (b) 2.5–3.0 mole of sodium hydroxide per mole of 1,4-dichlorobutene-2.
6. The process of claim 3 in which the quaternary ammonium salt has the general formula:

$$R_9R_{10}R_{11}R_{12}NCl$$

where $R_9$, $R_{10}$, and $R_{11}$ are aliphatic radicals of up to about 20 carbon atoms and $R_{12}$ is an aliphatic radical having from about 8 to 20 carbon atoms or a benzyl or substituted benzyl radical.
7. The process of claim 6 in which $R_9$ and $R_{10}$ are methyl, $R_{11}$ is $C_{12}$ to $C_{16}$ alkyl radicals and $R_{12}$ is benzyl.
8. The process of claim 6 in which at least one of $R_9$, $R_{10}$ and $R_{11}$ contains a hydroxy or ether group in a position beta to the nitrogen atom.
9. The process of claim 3 in which the quaternary ammonium salt has the general formula:

$$H(OCH_2CH_2)_xNR_{13}(CH_3)(CH_2CH_2O)_yH\cdot Cl$$

where $R_{13}$ is an aliphatic hydrocarbon radical of up to about 20 carbon atoms and the sum of $x$ plus $y$ ranges from about 2 to 15.
10. The process of claim 5 in which the quaternary ammonium salt is $C_{12}$ alkyl-benzyl-dimethyl-ammonium chloride.

References Cited
UNITED STATES PATENTS

| | | | |
|---|---|---|---|
| 2,448,641 | 9/1948 | Whitman | 260—666 |
| 2,276,203 | 3/1942 | Khasasch | 260—666 |

FOREIGN PATENTS

| | | |
|---|---|---|
| 681,546 | 3/1968 | Republic of South Africa. |

DELBERT E. GANTZ, Primary Examiner
V. OKEEFE, Assistant Examiner

U.S. Cl. X.R.
260—668